United States Patent [19]

Krause

[11] 4,158,144
[45] Jun. 12, 1979

[54] CIRCUIT ARRANGEMENT FOR THE TRANSMISSION OF ELECTRICAL SUPPLY POWER

[75] Inventor: Gerhard Krause, Rosenheim, Fed. Rep. of Germany

[73] Assignee: Siemens Aktiengesellschaft, Berlin & Munich, Fed. Rep. of Germany

[21] Appl. No.: 833,045

[22] Filed: Sep. 14, 1977

Related U.S. Application Data

[63] Continuation-in-part of Ser. No. 774,661, Mar. 4, 1977, Pat. No. 4,106,423.

[30] Foreign Application Priority Data

Sep. 17, 1976 [DE] Fed. Rep. of Germany ....... 2641912

[51] Int. Cl.² ............................................. G02B 27/00
[52] U.S. Cl. .................................. 250/551; 307/311; 363/126
[58] Field of Search .......................... 250/214 A, 551; 307/311; 363/125, 126

[56] References Cited

U.S. PATENT DOCUMENTS

| 3,062,961 | 11/1962 | Kalns et al. | 250/551 |
| 3,461,316 | 8/1969 | Acton et al. | 250/551 |
| 3,999,087 | 12/1976 | Compton | 307/311 X |

FOREIGN PATENT DOCUMENTS 559988  3/1975  Switzerland ............................ 307/311

Primary Examiner—James B. Mullins
Attorney, Agent, or Firm—Hill, Gross, Simpson, Van Santen, Steadman, Chiara & Simpson

[57] ABSTRACT

A circuit arrangement is disclosed for the transmission of electrical supply outputs for low power devices which must be electrically separated from the mains supply. The circuit arrangement has at least one opto-electronic coupler with which low power can be transmitted with complete electrical separation. Accordingly, mains transformers can be replaced in low power operations.

4 Claims, 6 Drawing Figures

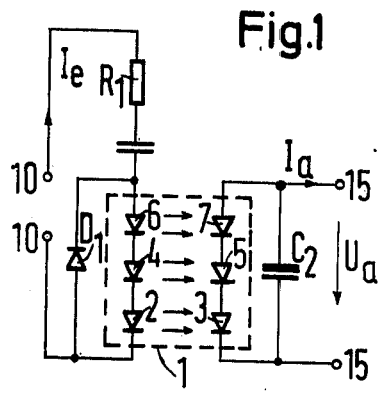
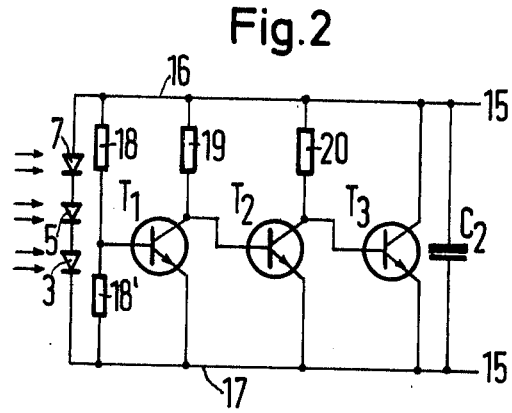
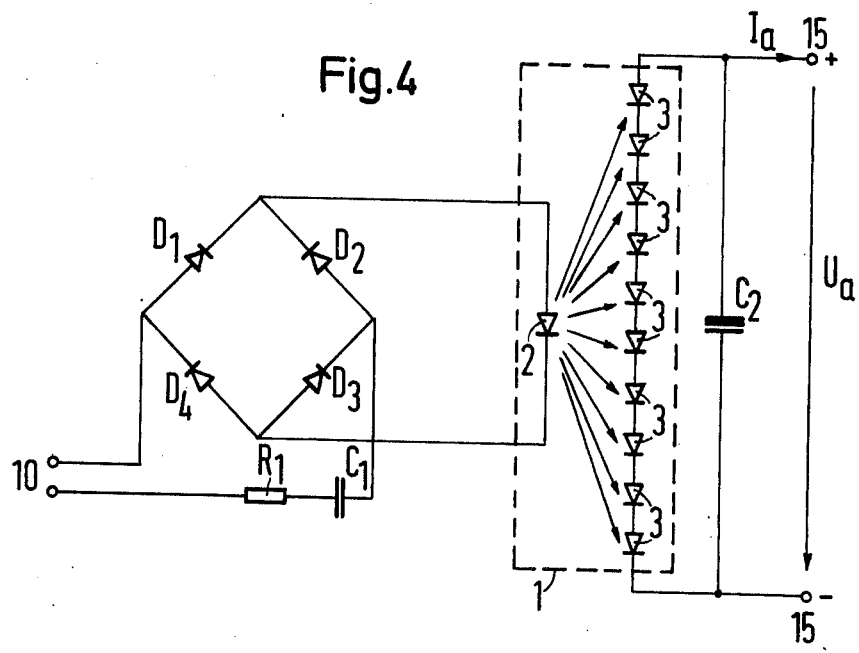

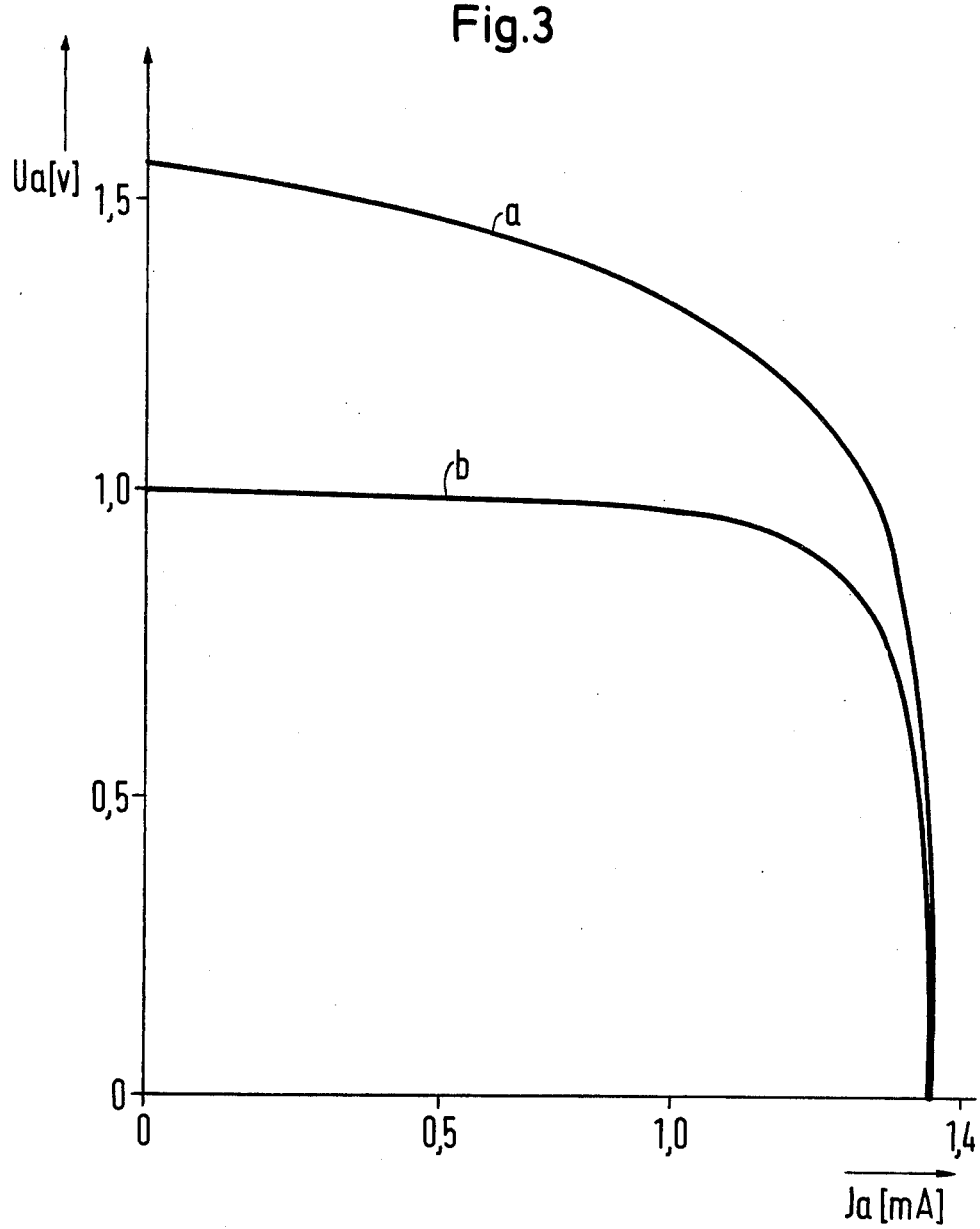

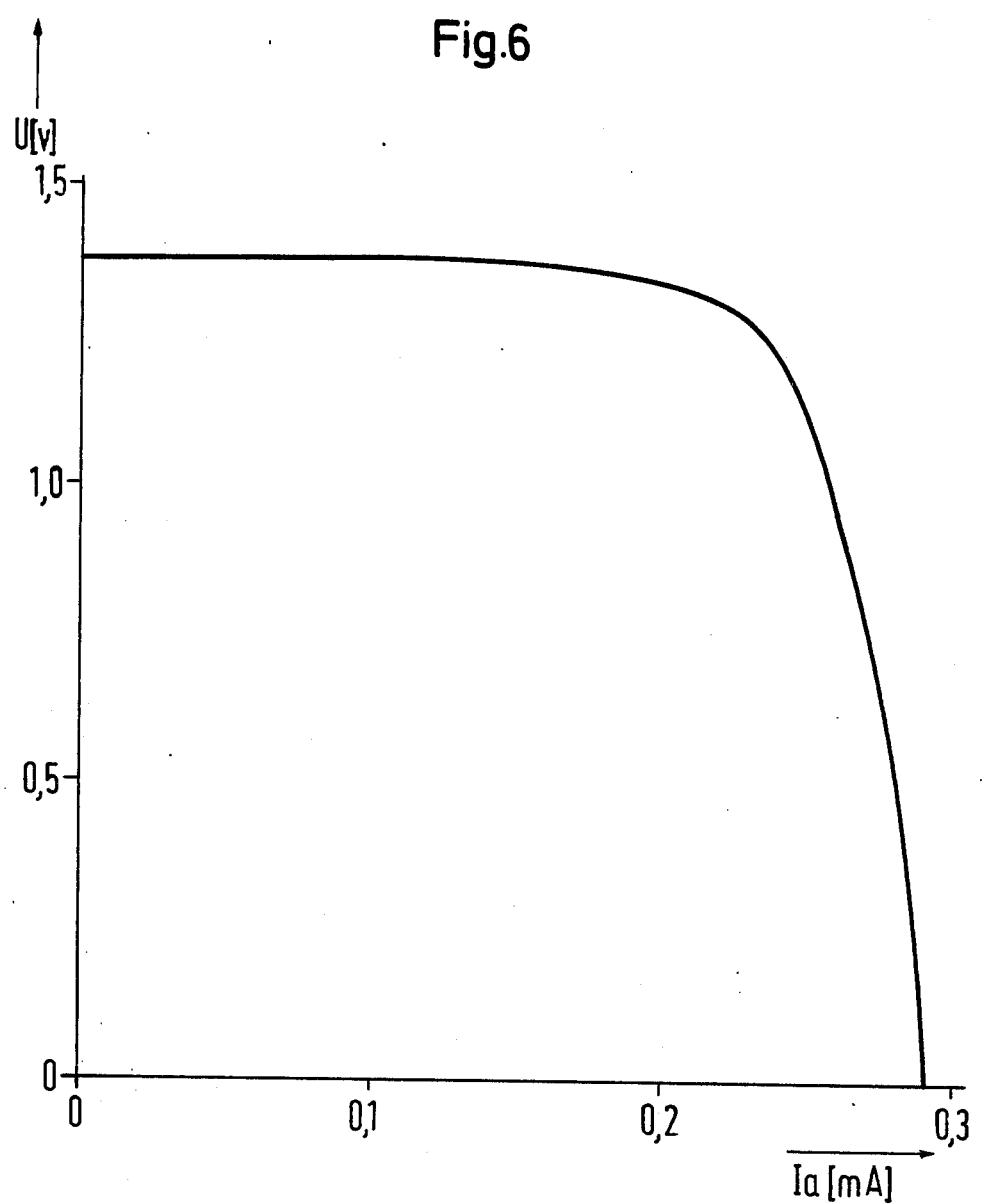

CIRCUIT ARRANGEMENT FOR THE TRANSMISSION OF ELECTRICAL SUPPLY POWER

RELATED APPLICATION

This application is a continuation-in-part of my earlier filed co-pending application U.S. Ser. No. 774,661, titled "Opto-Electronic Two-Way Coupling" filed Mar. 4, 1977 and issued July 11, 1978 as U.S. Pat. No. 4,100,423.

BACKGROUND OF THE INVENTION

The invention relates to a circuit arrangement for the transmission of electrical supply power from a primary side preferably connected to mains to a secondary side preferably connected to a small device (for example: pocket calculator, measuring device, digital watch, preamplifier) and wherein the secondary side is electrically separated from the primary side.

Until now, opto-electronic couplers have been solely employed for the transmission of digital or analog data. A circuit arrangement with opto-electronic couplers which allows transmission of energy has, however, not become known until now.

An opto-electronic two-way coupling with a signal input electrically separated from the signal output for signal voltages below 1 V has already been proposed by me in which a first opto-electronic coupler is connected via its transmitter to a signal input and via its receiver to a signal output (compare my co-pending U.S. patent application Ser. No. 774,661).

With this two-way coupling, small digital or analog data signal voltages under one volt may be transmitted with electrical separation of signal input and signal output. This is achieved by at least one further opto-electronic coupler parallel to the first coupler with a coupling direction opposite thereto.

SUMMARY OF THE INVENTION

It is an object of the present invention to provide a circuit arrangement for the transmission of electrical supply power, in particular low power, which is generally useful in small devices of all kinds which must be electrically separated from the mains, and where a small space requirement is necessary.

According to the invention at least one opto-electronic coupler is provided between the electrical energy source and the electronic circuit to be supplied, the receiver of the opto-electronic coupler acting as a photo-electric cell.

The circuit arrangement of the invention requires very little space and has a small weight, so that it can be integrated on a semiconductor chip and can be built directly into the mains plug. The electrical separation from the mains is completely guaranteed in the process.

A further development of the invention consists in connecting several photoelectric cells in series and in irradiating them with a luminescent diode.

It is advantageous that the photoelectric cells are integrated in a semiconductor crystal.

A further development of the invention consists also in one or more luminescent diodes being in series to a capacitor at the primary side, and in one diode being connected in parallel in the opposite direction to the luminescent diodes.

Another further development of the invention consists in one or more luminescent diodes in the primary side being connected to an output of a diode bridge, whose input branch is in contact with a mains voltage, via a capacitor.

In one embodiment a shunt regulator is provided in the secondary side for the stabilization of the output signal.

It is advantageous, furthermore, that between two lines connected to the two ends of the series circuit of the photoelectric cells, the shunt regulator has two resistors in series, a middle tap connected to the base of a first transistor, an emitter of the transistor connected to the one line, and a collector of the transistor connected via a resistor to the other line and to the base of a second transistor. The emitter of the second transistor is connected to the one line and its collector is connected via a resistor to the other line and to the base of a third transistor. The emitter of the third transistor is connected to the one line and its collector is connected to the other line.

In another embodiment of the invention the shunt regulator has two lines connected on the one hand to the ends of a series circuit of photoelectric cells, and on the other hand to the output. A middle tap between two diodes is connected to the base of a first transistor whose emitter is connected to the one line and whose collector is connected via a resistor to the other line and to the base of a second transistor. The emitter of the second transistor is connected to the one line and its collector is connected via a resistor to the other line and to the base of a third transistor. The emitter of the third transistor is connected to the one line and its collector is connected to the other line.

BRIEF DESCRIPTION OF THE DRAWINGS

FIG. 1 is a schematic diagram of a first embodiment of the invention;

FIG. 2 is a schematic diagram of an output stage of the circuit arrangement of this invention;

FIG. 3 is a graph illustrating characteristic curves for the circuit arrangements in FIGS. 1 and 2;

FIG. 4 is a schematic diagram of a second embodiment of the invention;

FIG. 5 is a schematic diagram of another output stage of the circuit arrangement of this invention; and FIG. 6 is a characteristic curve for the output stage of FIG. 5.

DESCRIPTION OF THE PREFERRED EMBODIMENTS

In FIG. 1 an opto-electronic coupling element 1 consists of three couplers with, in each case, a luminescence diode 2, 4 or 6, and with a photoelectric cell 3, 5 or 7. With a capacitor $C_1$ an input current $I_e$ supplied from a mains voltage source 10 is adjusted to approximately 100 mA$_{eff}$. For this, the capacitor $C_1$ has a capacitance of about 1.3 μF. In order to limit the turn-on current surge, the capacitor $C_1$ has a resistor $R_1$ connected ahead of it which has a resistance value of 100 ohms so that in the most unfavorable case a peak current of about 3 A can briefly flow. Since the luminescent diodes 2,4,6 in general have only a blocking voltage of 3 V, the blocking half-wave to which they are exposed must be short-circuited. For this, a diode $D_1$ is provided, which is connected in parallel and in the opposite direction to the luminescent diodes 2,4,6.

In the output stage, parallel to the photoelectric cells 3,5,7, there is a capacitor $C_2$ with a capacitance of 100 μF. The characteristic curve between the output current $I_a$ and the output voltage $U_a$ is designated in FIG. 3 with "a".

FIG. 4 shows a second embodiment of the inventive circuit arrangement in which the opto-electronic coupling element 1 consists of a luminescent diode 2 and a multiple photoelectric cell 3 composed of several integrated photoelectric cells. The remainder of the output stage is constructed the same as in the embodiment of FIG. 1. Here, however, the input stage consists of a diode bridge 11 with diodes $D_1$, $D_2$, $D_3$, $D_4$. The middle tap between the oppositely connected diodes $D_1$ and $D_2$ is connected to one end of the luminescent diode 2. The middle tap between the oppositely connected diodes $D_3$ and $D_4$ is connected to the other end of the luminescent diode 2. The middle tap between the diodes $D_2$ and $D_3$ is connected to the one terminal of the mains voltage via a capacitor $C_1$ with a capacitance of 0.9 $\mu F$ and a resistor $R_1$ with a resistance value of 100 ohms. The middle tap between diodes $D_1$ and $D_4$ is connected to the other terminal of the mains voltage.

The luminescent diode 2 is in the cross branch of the diode branch 11 in order to be able to utilize both half-waves of the mains voltage. It has been observed that when a pocket calculator is connected to the output terminals 15, the full power transmitted by the circuit arrangement in FIG. 4 is not required if the calculator takes up about 1 mW.

A substantial improvement of the internal resistance can be achieved if the output stage is stabilized. A stabilized output stage of this type is represented in FIG. 2, in which parts corresponding to one another are provided with the same reference symbols as in FIG. 1. Since the available voltage is relatively small, the output stage here consists of a three-stage shunt or transverse regulator. For this purpose, a series connection of two resistors 18, 18' is initially provided between two lines 16, 17 which are connected on the one hand to the series circuit of the photoelectric cells 3,5,7 and, on the other hand, to the output terminals 15. The middle tap between resistors 18,18' is connected to the base of a transistor $T_1$. The emitter of the transistor $T_1$ is connected to line 17. The collector of transistor $T_1$ is connected, via a resistor 19 with a resistance value of 100 K$\Omega$, to line 16 and to the base of a transistor $T_2$. The emitter of transistor $T_2$ is connected to line 17. The collector of transistor $T_2$ is connected on the one hand via a resistor 20 to line 16 and on the other hand to the base of a transistor $T_3$ whose emitter is connected to line 17 and whose collector is connected to line 16. As in the embodiment in FIG. 1, the capacitor $C_2$ has a capacitance value of 100 $\mu F$.

This output stage has a differential resistance of 50 ohms. With this stage, any value between the no-load voltage and zero volts can be optionally set at output 15, which is indicated in FIG. 3 by the characteristic curve b.

A system similar to FIG. 2 for stabilizing the internal resistance is shown in FIG. 5, in which parts corresponding to one another are provided with the same reference symbols as in FIG. 3. In this output stage the anode of the photoelectric cell 3 is directly connected to the base of transistor $T_1$. Resistors 21 and 22 respectively have a resistance value of 1 M$\Omega$ and 100 K$\Omega$. The load characteristic curve for this output stage is shown in FIG. 6. The differential internal resistance for this system amounts to about 100 ohms.

With integration of the output stages of FIGS. 2 and 5, transistors $T_1$, $T_2$ and $T_3$ can be produced with the same diffusion processes which are required for the photoelectric cells 3, 5, 7. In this way an integration on a semiconductor chip is possible. Load resistors 18, 18', 19, 20, 21 and 22 can then be dispensed with, since it is possible to proceed in such a way that with illumination the transistors simultaneously operate as a current source and as an amplifier.

The inventive circuit arrangement makes possible an energy transmission with complete potential separation so that mains transformers can be replaced in low power operations.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A circuit arrangement for the transmission of electrical supply power from a mains to a low power electronic device to be energized, comprising: a primary side of the arrangement connected to the mains; a secondary side of the arrangement connected to the electronic device, said secondary side being electrically isolated from the primary side; at least one opto-electronic coupler coupling the primary and secondary sides, a receiver of the opto-electronic coupler operating as a photo-electric cell means for supplying electrical power to the secondary side; and in the secondary side a shunt regulator means being provided for stabilization of output voltage.

2. A circuit arrangement according to claim 1, characterized in that between first and second output lines of the secondary side are connected a series circuit of a plurality of photoelectric cells and the shunt regulator means, said regulator means comprising two resistors in series having a middle tap connected to a base of a first transistor, an emitter of the first transistor being connected to the second line and whose collector is connected on the one hand via a resistor to the first line and on the other hand to a base of a second transistor, an emitter of the second transistor being connected to the second line and whose collector is connected on the one hand via a resistor to the first line and on the other hand to a base of a third transistor, an emitter of the third transistor being connected to the second line and whose collector is connected to the first line.

3. A circuit arrangement according to claim 1, characterized in that the shunt regulator means is connected between first and second output lines which also have a series circuit of a plurality of photoelectric cells connected therebetween, a middle tap between two of the photoelectric cells being connected to a base of a first transistor, an emitter of the first transistor being connected to the second line and whose collector is connected on the one hand via a resistor to the first line and on the other hand to a base of a second transistor, an emitter of the second transistor being connected to the second line and whose collector is connected on the one hand via a resistor to the first line and on the other hand to a base of a third transistor, an emitter of the third transistor being connected to the second line and whose collector is connected to the first line.

4. A circuit arrangement according to claim 1, characterized in that the shunt regulator means has a plurality of transistors integrated together with a plurality of photoelectric cells in a semiconductor crystal.

* * * * *